US005953672A

United States Patent [19]

Lengdell et al.

[11] Patent Number: 5,953,672

[45] Date of Patent: Sep. 14, 1999

[54] ARRANGEMENT IN A MOBILE SHORT-RANGE COMMUNICATION SYSTEM

[75] Inventors: Magnus Lengdell, Alvsjo; Kim Laraqui, Stockholm, both of Sweden

[73] Assignee: Telia AB, Farsta, Sweden

[21] Appl. No.: 08/901,309

[22] Filed: Jul. 28, 1997

Related U.S. Application Data

[63] Continuation of application No. 08/354,638, Dec. 13, 1994, abandoned.

[30] Foreign Application Priority Data

Dec. 27, 1993 [SE] Sweden .................................. 9304287

[51] Int. Cl.$^{6}$ ....................................................... H04B 7/00

[52] U.S. Cl. ........................... 455/517; 340/905; 340/989

[58] Field of Search .................................... 340/905, 988, 340/989, 991; 455/45, 54.1, 56.1, 158.5, 517, 524

[56] References Cited

U.S. PATENT DOCUMENTS

| | | | |
|---|---|---|---|
| 3,646,580 | 2/1972 | Fuller et al. | 340/989 |
| 3,899,671 | 8/1975 | Stover | 455/56.1 |
| 4,864,306 | 9/1989 | Wiita | 340/991 |
| 5,077,830 | 12/1991 | Mallia | 455/70 |
| 5,293,163 | 3/1994 | Kakihara | 340/905 |
| 5,539,395 | 7/1996 | Buss et al. | 455/38.1 |

FOREIGN PATENT DOCUMENTS

WO 92/17002 10/1992 WIPO .

*Primary Examiner*—Reinhard J. Eisenzopf
*Assistant Examiner*—Sam Bhattacharya
*Attorney, Agent, or Firm*—Oblon, Spivak, McClelland, Maier & Neustadt, P.C.

[57] ABSTRACT

The present invention relates to a radio-based mobile short-range communication system SRC, comprising a transmitting and receiving unit. The receiving units are offered information from the transmitting units from a number of information providers. The information providers offer information within one or more predetermined subject fields. The receiving unit selects a desired information and obtains this information presented via a presentation element. The transmitting unit transfers a protocol divided into a number of main divisions. For each information provider, the protocol is divided into a number of subdivisions, one of which indicates different subject fields. The subject fields constitute headings for different subject categories which are presented in a number of octets. Each subject field is represented by one bit which is set to 0 when the information provider does not have any information to deliver within the subject field and, respectively, to 1 for information which is provided. The receiver indicates the information provider from whom information is requested and, respectively, the subject field. The designated information is then presented on a presentation element. The receiver then obtains the desired information. The information can thereby be divided into a number of subheadings.

9 Claims, 2 Drawing Sheets

| | OCTET |
|---|---|
| PDU IDENTIFIER | 1 |
| LENGTH INDICATOR | 2 |
| OPERATOR IDENTIFIER / 0/1 | 3 |
| APPLICATION IDENTIFIER | 4 |
| APPLICATION IDENTIFIER | 5 |
| OPERATOR IDENTIFIER / 0/1 | 6 |
| ..... | |
| ..... | |

A1 VEHICLE TOLL
A2 FREIGHT
A3 PUBLIC TRANSPORT
A4 ROAD INFORMATION
A5 TRAFFIC INFORMATION
A6 TRAFFIC CONTROL
A7 PARKING
A8 SOS
A9 VEHICLE CONTROL

| | | | | | | | | |
|---|---|---|---|---|---|---|---|---|
| A1 | A2 | A3 | A4 | A5 | A6 | A7 | A8 | OCTET 1 |
| A9 | | | | | | | | OCTET 2 |

ARRANGEMENT IN A MOBILE SHORT-RANGE COMMUNICATION SYSTEM

This application is a Continuation of application Ser. No. 08/354,638, filed on Dec. 13, 1994, now abandoned.

TECHNICAL FIELD

The present invention relates to the transfer of information between stationary units and mobile units or, respectively, between mobile units. The system relates to the transfer of information between, for example, cars on a road or, respectively, between radio beacons along a road and cars.

PRIOR ART

Information relating to the traffic conditions and so forth within regional areas is transferred currently via different local radio stations. The information which is obtained is thus tied to the transmissions of the respective radio station. The information provided is thus provided by a respective radio station. The information which is transmitted is obtained via different reporters located in the coverage area of the local radio station. In this case one is dependent on, for example, the public for reporting disturbances in the traffic. One is also dependent on reports from the police who can provide information on disturbances and their duration. The action of various authorities, undertakings and so forth in various connections can have a disrupting effect on the traffic in connection with the digging up of roads or the like. There is thus a risk that essential information relating to disturbances in the traffic pattern may fail to arrive. Furthermore, information on various other activities which can be of importance but do not disturb the traffic is not normally given. The system with local radio transmitters used hitherto also does not directly provide information on the traffic situation, and instead the information is given at certain times, for example once every half hour or the like. A road user who is moving from the coverage area of one radio station to the coverage area of another radio station must also adjust the receiver to the current station.

DISCLOSURE OF THE INVENTION

TECHNICAL PROBLEM

There is a need to transmit and receive information relating partly to regional areas and partly to local areas. It is desirable in this connection that information relating to changes in the traffic pattern etc. is directly available to the road users. There is also a requirement that information from different information transmitters should be available simultaneously to the road user. In this connection, the information transmitters should be able to provide information of different types, for example road information, public transport arrangements, travel information, parking etc. The receivers should be able to identify easily the information items provided by different information providers. Selection and presentation of the information will in this case be possible in a simple manner. There is furthermore a requirement that information be transferred from cars to radio beacons which are arranged along the roads. It should also be possible for information to be exchanged between vehicles.

There is a requirement that there should be no resetting between different frequencies for receiving different radio transmitters.

The present invention intends to solve the above problems.

SOLUTION

The present arrangement relates to a radio-based mobile short-range communication system SRC comprising transmitting units and receiving units. The receiving units receive information from the transmitting units. The receiving units are offered information from the transmitting units from a number of information providers. Each information provider offers information within one or more predetermined subject fields. The receiving unit selects a desired information and obtain it presented via a presentation element. The transmitting unit transfers a protocol divided into a number of main divisions. For each information provider, the protocol is divided into a number of subdivisions, one of which indicates different subject fields. The subject fields constitute main headings for different subject categories. The subject fields are presented in a number of octets. Each subject field is represented by one bit which is set to 0 when the information provider does not have any information to deliver within the subject field and to 1 for information which is provided. The receiver indicates the information provider from which information is requested and, respectively, which subject field. The designated information is then presented by a presentation element. The receiver then receives the desired information. The information can be divided into a number of subheadings in this connection.

Each main division contains an operator identifier which includes one or more consecutive fields. The last bit in the operator identifier is set to 1 if further fields are required for identification. When the required number of fields have been utilized for the operator identifier, the last bit in the last field is set to 0.

The protocol also contains an overlapping identifier which identifies a respective transmitter and its geographic location.

ADVANTAGES

The present invention allows a simplified method to be utilized for the transfer of information between a transmitter and a receiver in short-range communication. This makes it possible to obtain information on the geographic location of a respective transmitter and by this means also information of the geographic location of a vehicle in a road network. Using this information, it is thus possible to specify the location of a vehicle in a road network within a densely populated area on a presentation element, for example a screen. Using this information, the road user can decide on his onward travel. The system also means that information relating to disturbances in the road network can be marked and that a route, which is best for the occasion, to a particular destination can be specified.

It is also possible to provide information from different information providers in parallel. By each information provider specifying the main areas in which he is providing information, it is easy for the receiver to decide which information provider should be utilized in a particular situation.

PREFERRED EMBODIMENT

In the text which follows, the concept of the invention is described with reference to the Figures and the designations therein.

Figures 1, 2, 3:
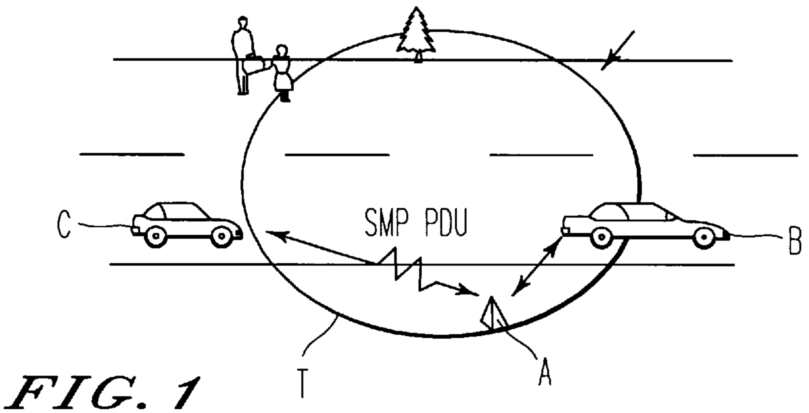
FIG. 1 shows a diagrammatic picture with a number of vehicles and a radio transmitter placed at the roadside. The Figure also shows an imagined coverage area for the radio transmitter.
FIG. 2 shows the structure of the protocol.
FIG. 3 shows an example of how the application field can be represented.
Figure 4:
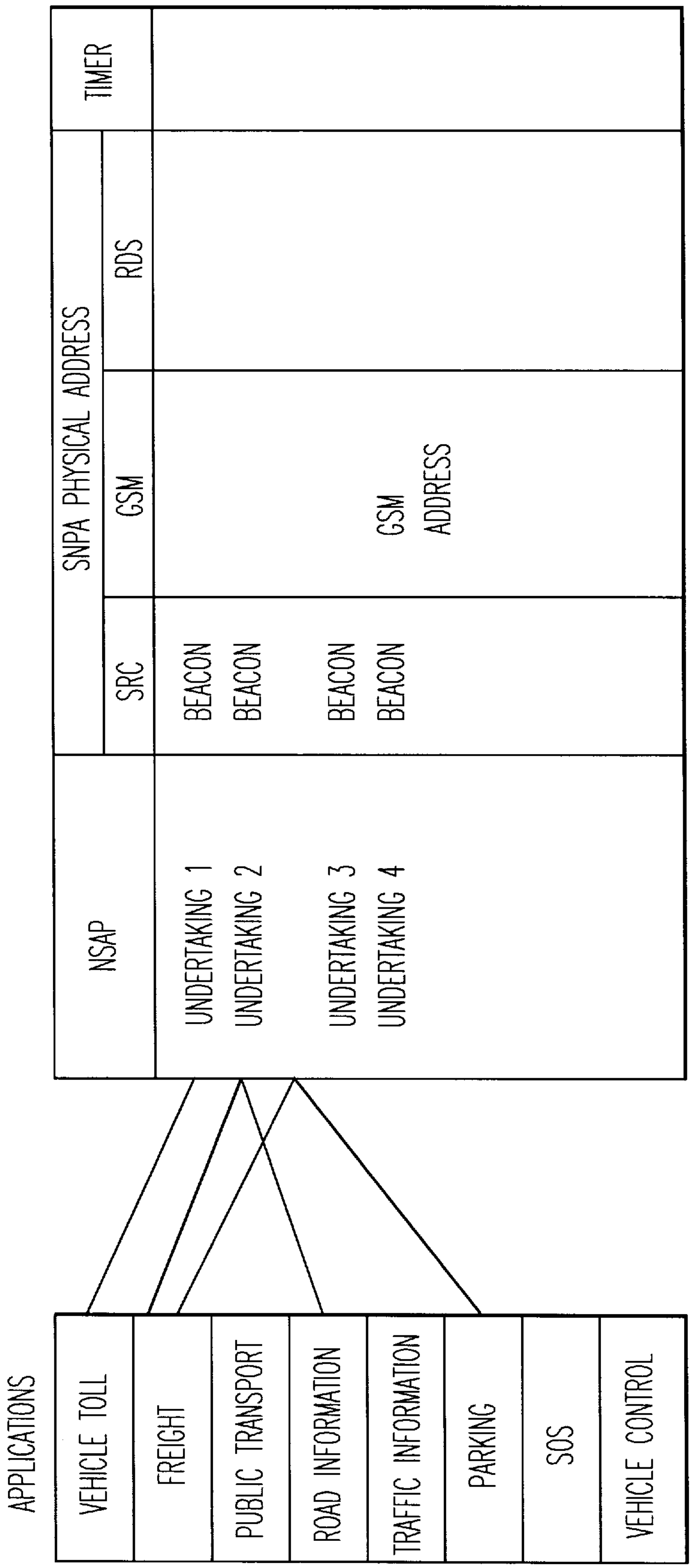
FIG. 4 shows an example of how a number of information providers are related to a number of information areas.

Radio transmitters A as shown in FIG. 1 are arranged with a certain spacing along a road. Each radio transmitter has a coverage area, the coverage limit T of which constitutes the limit of the range of the radio transmitter. The coverage area of the radio transmitters is some one hundred meters. Cars B, C which are located along the road move into and, respectively, out of the coverage area of different radio transmitters along the way. In the text which follows, the invention is described on the basis of transmission between cars on a road and radio transmitters along the road. However, the invention is not limited to apply only to cars but can also apply to any road users with radio transmitters and receivers for the communication intended here.

When a car arrives in the coverage area of a radio transmitter, the car receives information from the radio transmitter. The information consists of a protocol according to FIG. 2. The protocol contains firstly an identifier which identifies the respective transmitter and its geographic position. The total length of the protocol is specified by a length indicator. A number of main identifications, operator identifiers, identify different operators who provide information from the transmitter in question. The operator identifier comprises one or more fields. At the end of each field, the last bit is utilized for identifying whether the operator identifier comprises one more field or not. When the last bit is set to 1, one more field is utilized for identifying the operator. When the last bit in the field is set to 0, this indicates that no further fields are utilized for identification of the operator. In addition to the operator identifier, a number of application identifier fields are also utilized. Two operator identifier fields have been specified in the Figure, but the number of fields is not crucial to the invention.

In the application identifiers, each bit specifies an explicit subject field. Thus, a one indicates, for example field 3, see FIG. 3, that this information provider provides information relating to public transport.

In the car, the information is received and presented via a presentation element. The presentation element can be constructed in different ways, for example the information can be presented on a screen, written out on paper or in verbal form. The receiver identifies both the information providers and the information a respective information provider can provide. The receiver in the car then marks which information provider and which information it will have presented. The selection is made, for example, by pressing buttons or by giving verbal orders. The information is then presented to the receiver via the presentation element.

The invention also means that information is transferred directly between cars which are located in the vicinity of one another or, respectively, that information from the cars can be transferred to the radio transmitters at the roadside. The information which is transferred from the cars to the radio transmitters at the roadside is utilized for identifying the traffic intensity on the traffic route in question. Furthermore, the information can be utilized for determining the speed at which the traffic is moving at the time. This information is then forwarded to central monitoring functions which process the information and send out the information relating to the traffic situation to radio transmitters located in the system along roads in the system. Transfer of information between cars can be utilized for different purposes. For example, the information can relate to the speed at which the traffic is moving. Furthermore, information relating to the immediate traffic situation is transferred between cars. In this way, a warning can go out from cars further ahead that the road situation is at a halt, that the traffic is at a standstill and so forth. Emergency vehicles transfer information to the nearest traffic with a request for free passage. Furthermore, information is transferred to the radio transmitters at the roadside. The radio transmitters register the route which the emergency vehicles intend to use. This information is received by the radio transmitters and forwarded to affected radio transmitters along the selected route. The information is then transmitted to road users in the area with the request that the traffic route should be made accessible. Reception of the information can be partly normal and partly through a special warning signal being given to road users with information on how to proceed. By this means, road users along the traffic route will obtain information that emergency vehicles are approaching and that a free passage should be established for the emergency vehicles. Vehicles along the road can thereby transfer information to the radio transmitters along the roadside with information relating to the traffic situation and the passability. This information is forwarded to the emergency vehicles which are thereby able to assess the possibility of advancing along different road sections and thereby to select the most suitable route for the occasion.

The system can also be used for road users within a geographic area relating to route selection information. A road user who, for example, comes from another area and intends to take himself to a certain location selects an information provider who provides a suitable type of information. The road user specifies the address he/she wishes to arrive at. The information is transferred to the radio transmitters at the roadside. The road user's geographic location is identified by the radio beacon which receives the information. The information is transferred to centrally arranged means which register the geographic location of the road user and the desired destination. A map with a marked route is then transferred to the vehicle. The map is presented on the presentation element arranged in the vehicle. As an alternative to the map, the route description is transferred in verbal form, specifying road names and how to proceed at various intersections etc.

The invention is not limited to the embodiment shown above but can be subjected to modifications within the scope of the patent claims following and the concept of the invention.

We claim:

1. A radio-based mobile short-range communication system comprising:

a transmitting unit configured to receive radio frequency information from at least one mobile unit and transmit a message comprising an information item from at least one of a plurality of information providers on at least one of a plurality of subject categories, said transmitting unit comprising a protocol mechanism that forms said message in a protocol format, said protocol format comprising, a plurality of main divisions corresponding to respective of said information providers, comprising, an identification field corresponding to one of said plurality of information providers, and an application field that identifies at least one of said plurality of subject categories; and said at least one mobile unit comprising, a mobile transmitter configured to transmit said radio frequency information to at least one of said transmitting unit and a second mobile unit, said radio frequency information including parameters of operation of said mobile unit, and a mobile receiver configured to receive said message transmitted from the transmitting unit comprising, a user-actuated selection device, and a presentation element, wherein said information item pertaining to a particular subject category is presented on said presentation element in response to actuating said user-actuated selection device with a selection of at least one of said plurality of information providers and at least one of said subject categories.

2. A system according to claim 1, wherein said protocol mechanism forms said message to include a listing of the subject categories in said application field.

3. A system according to claim 1, wherein said protocol mechanism forms said message to include in said application field a set of one bit data fields indicative of whether respective of said subject categories are present in said message.

4. A system according to claim 1, wherein said protocol mechanism forms said message to include in said application field a first one-bit data field set to a first value indicative of information pertaining to one of said subject categories being present in said message and set to a second value indicative of no information pertaining to said one of said subject categories being present.

5. A system according to claim 1, wherein said protocol format of said protocol mechanism comprises the operator identification field transmitted prior to said application field.

6. A system according to claim 5, wherein said operator identification field of said message comprises at least one consecutive sub fields.

7. A system according to claim 6, wherein said at least one consecutive sub field comprises a last bit position indicating whether said identification field comprises two or more consecutive sub fields.

8. A system according to claim 7, wherein a first value set in said last bit position of a first of said at least one consecutive sub field indicates a second of said consecutive sub fields is present, and a second value set in said last bit position indicates no consecutive second sub field is present.

9. A system according to claim 1, wherein said protocol mechanism forms said message to include a geographic position field for providing geographic position information on said transmitting unit.

* * * * *